United States Patent Office 3,050,562
Patented Aug. 21, 1962

3,050,562
OXO SYNTHESIS AND CATALYSTS THEREFOR
Oskar E. H. Klopfer, Bloomfield Hills, Mich., assignor to Ethyl Corporation, New York, N.Y., a corporation of Delaware
No Drawing. Filed June 1, 1961, Ser. No. 113,996
10 Claims. (Cl. 260—598)

This invention relates to new catalytic action, and more particularly to new catalysts for the oxo reaction.

This application is a continuation-in-part of my prior co-pending application, Serial No. 645,661, filed March 13, 1957, now abandoned.

The well known oxo reaction consists of combining an olefin with carbon monoxide and hydrogen (usually as synthesis gas) in the presence of a cobalt-containing catalyst to produce an aldehyde. The reaction can be considered as equivalent to addition of a formaldehyde molecule across the double bond of the olefin. The aldehyde which is produced is ordinarily reduced to the corresponding alcohol either concurrently with the oxo step or in a second reaction stage.

Although several forms of cobalt are suitable as catalysts for the oxo reaction, it has been clearly established that in order to function they must first be converted to cobalt carbonyl of the formula $$[Co(CO)_4]_2$$

and there is strong evidence that this carbonyl in order to act as a catalyst must be converted under the oxo conditions to a hydride having the formula $$HCo(CO)_4$$

These two compounds are quite unstable. For example, at atmospheric pressure the hydride starts to decompose slightly above its melting point (−26° C.) into dicobalt octacarbonyl and hydrogen. The carbonyl, in turn, decomposes at 52° C. The instability of these catalytically active materials results in lower yields in the process as commercially practiced, and moreover, a limiting upper temperature is imposed on the process. This yield deficiency is particularly true with respect to the alcohol products which are the products of commercial interest. It has been found impractical to operate the oxo process above something like 200° C. even though faster reaction rates would be achieved at such temperatures.

Certain forms of iron carbonyl have also been prepared as oxo catalysts. These appear to be even less successful than cobalt carbonyl.

It is an object of this invention to provide new catalysts for the oxo reaction. It is a further object to provide a new mode of carrying out the oxo reaction whereby greater yields are obtained under conventional oxo temperatures and whereby the process can be operated at temperatures higher than conventional thus achieving greater reaction rates.

The above and other objects are accomplished by providing new catalysts for the oxo synthesis which consist of manganese polycarbonyls of the formula $$R_aMn(CO)_y$$

where R is an organic group, preferably an alkyl or aryl hydrocarbon group, an acyl group, or a cyclopentadienyl hydrocarbon radical, where $a$ is a whole number varying from 0 to 1 and where $y$ is an odd whole number varying from 3 to 5. The catalysts of this invention thus comprise manganese pentacarbonyls and manganese tricarbonyls and include such compounds as manganese pentacarbonyl, alkyl manganese pentacarbonyl, acyl manganese pentacarbonyl, aryl manganese pentacarbonyl, cyclopentadienyl manganese tricarbonyl and the like.

It has been found surprisingly that use of such catalysts which are completely novel for the oxo reaction (and which represent the first instance that any compound except a cobalt compound or an iron compound has been demonstrated to be operative as an oxo catalyst) not only results in higher yields under ordinary oxo temperatures (75 to 200° C.) but can even be advantageously used at temperatures above those at which the conventional oxo synthesis becomes marginal or inoperable. Thus, one important aspect of this invention comprises conducting the oxo process with the new catalysts at 200–300° C., although very good results are gotten when the catalysts are used at 75–200° C. Our invention thus makes it possible to conduct the oxo synthesis under optimum temperature conditions, which up to now has been infeasible.

Thus, the present invention comprises reacting an olefin with a mixture of carbon monoxide and hydrogen under formylation conditions in the presence of a manganese polycarbonyl of the formula $$R_aMn(CO)_y$$

where R is an organic group, preferably an alkyl or aryl hydrocarbon group, an acyl group, or a cyclopentadienyl hydrocarbon radical, where $a$ is a whole number varying from 0 to 1 and where $y$ is an odd whole number varying from 3 to 5. More specifically, this invention comprises formylation of olefins with carbon monoxide and hydrogen using as a catalyst a compound selected from the class consisting of manganese tricarbonyls and manganese pentacarbonyls.

The following examples illustrate the use of the new catalysts of this invention in the oxo synthesis.

EXAMPLE I

The apparatus consists of a pressure vessel equipped with means for agitation and means for heating and cooling. The vessel is also equipped with openings for introduction of gases, liquids and solids.

In this vessel is placed 500 parts of hexane and 5 parts of acetyl manganese pentacarbonyl. Five hundred pounds of ethylene pressure is imposed on this mixture and then the reactor is further pressured with 970 p.s.i. of a 1 to 1 mixture of carbon monoxide and hydrogen (synthesis gas). The reactor is heated with agitation at a temperature of 75° C. for one hour while maintaining the total pressure at 1470 p.s.i. At the end of this time, the reaction mixture is cooled and vented to the atmosphere through a Dry Ice trap. In the trap are collected a mixture of products consisting of propionaldehyde and n-propyl alcohol. A yield of these materials greater than that when employing conventional catalysts is obtained.

EXAMPLE II

In the reactor of Example I is placed 500 parts of octene-1 and 25 parts of phenyl manganese pentacarbonyl. The reactor is pressured to 1470 p.s.i. with a 55–45 mixture of hydrogen and carbon monoxide. The mixture is heated at 200° C. at this pressure for a period of two hours. At the end of this time, the reactor is cooled and the pressure released. Fractionation of the residual product leads to a good yield of mixed $C_9$ aldehydes and alcohols. The yield is superior to that produced with conventional oxo catalysts.

EXAMPLE III

Using the procedure of Example I, ethylene is formylated with carbon monoxide and hydrogen using hexyl manganese pentacarbonyl as the catalyst in amount corresponding to 0.1 percent based on the weight of ethylene used. Reaction temperature is 300° C. and the pressure 2940 pounds. Propionaldehyde is recovered in good yield.

EXAMPLE IV

Following the procedure of Example II, a $C_{12}$ olefin cut consisting of propylene tetramer is formylated with carbon monoxide and hydrogen using benzyl manganese pentacarbonyl as catalyst. The reaction temperature is 150° C. and the pressure is 2720 pounds. A high yield of mixed $C_{13}$ aldehydes and alcohols is produced.

EXAMPLE V

A mixture of heptylenes produced by copolymerization of propylene and isobutylene with a phosphoric acid catalyst and fractionation of the resulting mixed polymer to obtain a cut boiling between 76 and 99° C. is formylated according to the above procedure using cyclopentadienyl manganese tricarbonyl (1 percent by weight of the olefin feed) as catalyst. The reaction temperature is 75° C. and the pressure of carbon monoxide and hydrogen is 4400 p.s.i. After two hours' reaction the reactor is vented to atmospheric pressure and heated to 150° C. in the presence of hydrogen to decompose the catalyst. The catalyst-free product is then hydrogenated to obtain a mixture of $C_8$ alcohols which are very useful in the manufacture of plasticizers. The chief alcohol present is 3,5-dimethyl hexanol along with substantial quantities of 4,5-dimethyl hexanol, 3,4-dimethyl hexanol, 3-methyl heptanol and 4-methyl heptanol.

EXAMPLE VI

Ethylene was formylated with synthesis gas according to the procedure of Example I. The reaction was run in hexane and used manganese pentacarbonyl as the catalyst. The temperature was 200° C. and the pressure was 3200 p.s.i. After a reaction time of one hour, propionaldehyde was recovered in very good yield. The propionaldehyde gave a typical test with 2,4-dinitrophenyl hydrazine.

EXAMPLE VII

One hundred and twelve parts of diisobutylene was formylated with synthesis gas at a pressure of 2000 p.s.i. and a temperature of 200° C. for a reaction time of one hour. The catalyst was methyl manganese pentacarbonyl (5 parts) and the diluent was 860 parts of hexane. Using recovery procedures of the type in the preceding examples, $C_9$ alcohols useful in production of plasticizers were recovered in good yield.

EXAMPLE VIII

The procedure of Example VI was repeated using cyclohexene in place of the ethylene. One hundred parts of cyclohexene, 420 parts of hexane and 5 parts of manganese pentacarbonyl were charged to the reactor whereupon the reactor was pressured to 1000 p.s.i. with hydrogen and then up to 2000 p.s.i. with carbon monoxide. The reaction was carried out at 200° C. for 45 minutes; the pressure at this temperature was 3200 p.s.i. The product, a mixture of hexahydrobenzaldehyde and hexahydrobenzyl alcohol, was oxidized with potassium bichromate to obtain cyclohexane carboxylic acid which was identified by comparison of its melting point with the literature melting point. A 70 percent conversion of the cyclohexene was achieved.

EXAMPLE IX

Butadiene was formylated with synthesis gas using manganese pentacarbonyl as the catalyst. The temperature was 200° C. and the pressure 3200 p.s.i. After a reaction time of one hour the reaction mixture was worked up as described in the preceding examples. The resulting product was hydrogenated with platinum as the catalyst at 200° C. and 1500 p.s.i. for one hour. The resulting pentanol product was obtained in 90 percent yield.

EXAMPLE X

Hexene-1 was formylated with a mixture of carbon monoxide and hydrogen using methyl manganese pentacarbonyl as the catalyst. The reaction conditions and work-up procedures were of the type described in the preceding examples. A satisfactory yield of the conventional oxo products was obtained.

EXAMPLE XI

According to the procedures of the preceding examples, methyl cyclopentadienyl manganese tricarbonyl was used as the catalyst in the formylation of hexene-1 with a mixture of carbon monoxide and hydrogen. The corresponding oxo products were obtained in good yield.

As the above examples illustrate, the present invention is applicable to a wide range of olefin reactants and to a wide range of reaction conditions, e.g. temperature, pressure and time. It is noteworthy to observe that the present invention permits the use of temperatures higher than those employed in the conventional oxo process and thus permits taking advantage of all the benefits derived from operating at these more elevated temperatures. This is considered one of the outstanding features of the invention. Moreover, it is a particularly surprising feature in view of the fact that manganese carbonyl hydride—the counterpart of the cobalt carbonyl hydride of the conventional process—appears to be even less stable than the latter compound as no one has succeeded in obtaining it in the pure state at room temperature or higher as far as is known.

The preceding examples also show that the present catalysts perform to give excellent results under ordinary oxo temperatures. Thus, herein is provided a process which permits greater flexibility of operation than before and also leads to greatly improved results.

In general, the compounds which function as catalysts in the oxo process according to this invention can be designated by the formula $$R_aMn(CO)_y$$

where R is an organic group, preferably an alkyl or aryl hydrocarbon group, an acyl group, or a cyclopentadienyl hydrocarbon radical, where $a$ is a whole number varying from 0 to 1 and where $y$ is an odd whole number varying from 3 to 5. Thus, one of the catalysts of this invention is manganese pentacarbonyl itself having the formula $$Mn(CO)_5$$

Another group of catalysts comprises the substituted manganese pentacarbonyls having the formulas $$RMn(CO)_5$$

and $RCOMn(CO)_5$. In these formulas, R is preferably an alkyl or aryl hydrocarbon group. When R is an alkyl hydrocarbon group it is preferably a saturated monovalent hydrocarbon group of 1 to 12 carbon atoms. This alkyl group in a preferred embodiment also can be substituted with aromatic hydrocarbon radicals as in benzyl manganese pentacarbonyl. When R is an aromatic hydrocarbon radical it is preferably a monovalent hydrocarbon radical of 6 to 10 carbon atoms bonded to manganese through an aromatic carbon atom. Typical examples of this embodiment of the invention thus include methyl manganese pentacarbonyl, ethyl manganese pentacarbonyl, sec-amyl manganese pentacarbonyl, dodecyl manganese pentacarbonyl, phenyl manganese pentacarbonyl, naphthyl manganese pentacarbonyl, tolyl manganese pentacarbonyl, tetramethylphenyl manganese pentacarbonyl, acetyl manganese pentacarbonyl, benzoyl manganese pentacarbonyl, propionyl manganese pentacarbonyl, toluyl manganese pentacarbonyl, and the like up to acylated compounds having 12 carbon atoms in the organic radical. It has also been found that the hydrocarbon groups can have other substituents on them without greatly detracting from their usefulness as catalysts in this invention, and also they may have unsaturation in the aliphatic radical as in the case of allyl manganese pentacarbonyl.

In a third embodiment of the invention, I employ compounds of the formula $$RMn(CO)_3$$

where R is a cyclopentadienyl hydrocarbon radical preferably of 5 to 9 carbon atoms. Typical examples include cyclopentadienyl manganese tricarbonyl, methyl cyclopentadienyl manganese tricarbonyl, indenyl manganese tricarbonyl, and the like. In a less preferred form of this embodiment the cyclopentadienyl radical can be substituted with acyl, halogen, alkoxy groups, etc.

The preparation of the catalysts of this invention is relatively easy to accomplish. Thus, manganese pentacarbonyl can be conveniently made by reaction of phenyl magnesium chloride with manganous chloride in the presence of carbon monoxide. Upon treatment with sodium under certain conditions this compound is converted to sodium manganese pentacarbonyl which can be reacted with alkyl halides, alkyl sulfates, acyl halides, etc. to produce the alkyl manganese pentacarbonyls and acyl manganese pentacarbonyls. In the case of the acyl pentacarbonyls where the acyl halide is aromatic, e.g. benzoyl chloride, thermal decomposition of the acyl manganese pentacarbonyl leads to formation of the aryl manganese pentacarbonyl.

The cyclopentadienyl manganese tricarbonyl catalysts of this invention can be conveniently prepared by reaction of cyclopentadienyl sodium with manganous chloride followed by treatment of the intermediate product thereby formed with carbon monoxide.

The following examples illustrate preparation of typical organic catalysts of this invention.

EXAMPLE XII

Preparation of Benzoyl Manganese Pentacarbonyl

The sodium salt of 120 parts of manganese carbonyl was prepared by reacting it with 2000 parts of 1 percent sodium amalgam in 1330 parts of tetrahydrofuran as diluent. The resulting clear amber solution was decanted and to it was added 90 parts of benzoyl chloride. A red color developed and sodium chloride was precipitated. After one-half hour the solution was poured into ice water and the yellow solid which formed was filtered off and dried to give 165 parts of crude benzoyl manganese pentacarbonyl melting at 88–91° C. with decomposition. Recrystallization of this material forming 1:3 benzene-petroleum ether mixture gave pale-yellow plates melting at 95–96° C. with gas evolution. Analysis shows 18.3 percent manganese which corresponds exactly with the calculated amount for the benzoyl manganese pentacarbonyl product. The infrared spectrum of the material supported the elemental analysis.

EXAMPLE XIII

Preparation of Benzyl Manganese Pentacarbonyl

Sodium manganese pentacarbonyl was prepared as per Example XII. After standing overnight, the supernatant liquid was decanted from the mercury in a nitrogen atmosphere.

A 100 milliliter aliquot portion of the solution calculated to contain 0.021 mole of $NaMn(CO)_5$ was treated in a nitrogen atmosphere with 2.63 parts (0.021 mole) of benzyl chloride, then heated on a steam bath for 15 minutes. A light colored precipitate was seen to form almost immediately on heating. Centrifugation followed by decantation of the liquid gave 1.1 part of white solid determined to be sodium chloride. The liquid solution was cautiously evaporated to dryness under reduced pressure, then sublimed at 1 millimeter and temperatures up to 100° C. A total of 5.25 parts of sublimate, pale-yellow in color and contaminated by small amounts of a bright yellow liquid, was collected on the cooling probe. By careful resublimation at room temperature it was possible to isolate sufficient uncontaminated material for extensive analyses; melting point 37.5–38.5° C. The compound, benzyl manganese pentacarbonyl, contains no halogen, leaves a brown residue on ignition, and organic solutions deposit a brown precipitate when exposed to light. Calculated for $C_{12}H_7MnO_5$: Mn, 19.3 percent; C, 50.4 percent; H, 2.45 percent. Found: Mn, 19.6 percent; C, 49.7 percent; H, 2.28 percent.

The infrared spectrum shows strong carbonyl absorption and indicates that the benzene ring is monosubstituted. The yield was 87.5 percent of theory. Based on the sodium chloride obtained, the yield was 91.5 percent.

EXAMPLE XIV

Preparation of Acetyl Manganese Pentacarbonyl

Four hunderd fifty-eight parts of manganese pentacarbonyl were treated with 300 parts acetyl chloride in 4450 parts of tetrahydrofuran. There was an immediate reaction with the formation of a yellow color and the appearance of a white precipitate. After standing for fifteen minutes the material was poured into ice water. A yellow solid formed which was filtered off, washed several times with cold water, and dried to give 350 parts of acetyl manganese pentacarbonyl; melting point 43–48° C. This material was sublimed to give 260 parts of a white solid; melting point 54–56° C. The infrared spectrum supports the acetyl manganese pentacarbonyl structure. The yield was 51 percent. Calculated for $C_7H_3O_6Mn$: Mn, 23.1. Found: Mn, 23.1 percent.

EXAMPLE XV

Preparation of Methyl Manganese Pentacarbonyl

To 880 parts of tetrahydrofuran solution containing 87.2 parts of sodium manganese pentacarbonyl was added 75.5 parts of dimethyl sulfate. There was an immediate reaction as evidenced by a rise in temperature, a small amount of precipitate and gelation of the mixture. After standing overnight in an inert atmosphere, the mixture was added to 5000 parts of ice water, shaken thoroughly and filtered. Cautious air drying was necessary since the product is quite volatile. The yield of crude material was 50 parts (59.5 percent) of theory; melting point 94–95° C. Recrystallization from low boiling petroleum ether raised the melting point of the methyl manganese pentacarbonyl to 94.5–95° C. Calculated for $C_6H_3MnO_5$: C, 34.3 percent; H, 1.43 percent; Mn, 26.2 percent. Found: C, 34.5 percent; H, 1.37 percent; Mn, 26.4 percent.

The infrared spectrum supports the manganese carbonyl structure with the methyl group attached directly to manganese. The high volatility of the material is shown by its rapid disappearance in a stream of air plus the fact that it apparently boils in a melting point tube when heated to 140–145° C.

EXAMPLE XVI

Preparation of Phenyl Manganese Pentacarbonyl

One hundred parts of benzoyl manganese pentacarbonyl was placed in a sublimation apparatus under vacuum. The material was heated to 110° C. by means of an oil bath and at 90° C. melting began with vigorous evolution of a gas. On cooling, the melt solidified. Analysis of evolved gas showed it to be 98 percent carbon monoxide. The pale yellow solids, melting point 47–50° C., weighed 78 parts. This material was very slowly sublimed to give white crystals, melting point 52–53° C., and a few small crystals of manganese carbonyl, melting point 152° C. Infrared and elemental analysis of the material melting at 52° C. supported a phenyl manganese pentacarbonyl structure. Calculated for $C_{11}H_5O_5Mn$: C, 48.5 percent; H, 1.85 percent; Mn, 20.2 percent. Found: C, 48.9 percent; H, 1.95 percent; Mn, 20.2 percent.

EXAMPLE XVII

Preparation of Allyl Manganese Pentacarbonyl

When $NaMn(CO)_5$ contained in tetrahydrofuran was treated with allyl chloride in a nitrogen atmosphere and the resulting mixture cautiously heated to reflux for one hour, the mixture become turbid. Removal of the solvent by distillation through a helix-packed column followed by distillation of the residues at reduced pressure gave a small yield of allyl manganese pentacarbonyl as a pale-yellow liquid which solidifies on cooling to ice bath temperature. This material appears to undergo oxidative decomposition on exposure to air.

EXAMPLE XVIII

A reaction vessel equipped with means for charging and discharging liquids and solids, gas inlet and outlet means, temperature measuring devices, heating and cooling means, means for agitation, and means for condensing vapors, was flushed with prepurified nitrogen. To the flask were then added 400 parts of tetrahydrofuran and 23 parts of sodium dispersed in 23 parts of mineral oil. An atmosphere of nitrogen was maintained in the reaction vessel throughout the run. The vessel was cooled to 10° C. and 66.7 parts of freshly-distilled cyclopentadiene was added in small increments with agitation while maintaining the temperature below 15° C. After the addition of the cyclopentadiene, the temperature was allowed to rise to 23° C. over a period of about two hours when the completion of the formation of the sodium cyclopentadiene was evidenced by the cessation of hydrogen evolution. To this solution of cyclopentadienyl sodium in tetrahydrofuran was added 63 parts of anhydrous manganous chloride. The mixture was heated and maintained at reflux temperature for 20 hours. At the end of this time, the solvent was removed by distillation under reduced pressure and the product purified by sublimation at a pressure of about 2 millimeters of mercury at about 130° C., producing 48.64 parts, 52.3 percent yield, of lustrous brown-black bis-(cyclopentadienyl)manganese crystals. Analysis of the product showed it to contain 64.9 percent carbon and 5.44 percent hydrogen, corresponding to the formula $(C_5H_5)_2Mn$, calculated 64.9 percent carbon and 5.41 percent hydrogen. The bis-(cyclopentadienyl)manganese oxidizes readily in air and should, therefore, be kept in an inert atmosphere, such as nitrogen.

The bis-(cyclopentadienyl)manganese together with 88 parts of diethylether was charged under a nitrogen atmosphere to a pressure resistant vessel which had been flushed with prepurified nitrogen. The vessel was equipped with gas inlet and outlet valves, temperature and pressure measuring devices, heating and cooling means, and means for agitation. The vessel was pressured with carbon monoxide to 1975 p.s.i. at 26° C. and then the temperature was slowly raised to 158° C. The reaction between the CO and $(C_5H_5)_2Mn$ was conducted at a temperature within the range of 22° C.–158° C. and at a pressure ranging from 1160 to 2800 p.s.i. for a period of 7 hours. The excess CO was then released below 30° C. and the reaction mixture, a yellow-brown slurry, was removed from the vessel. The solids were removed by filtration and the residue washed with ether to remove the last traces of product which is soluble in the ether. The ether was then distilled off at reduced pressure and the product purified by sublimation. It consisted of a yellow air-stable, water-insoluble solid having a melting point of 77° C. It is readily soluble in most hydrocarbons and organic solvents including benzene, hydrocarbon fuels, lube oils, hexane, ether, alcohol, acetone, etc. Analysis showed it to contain 47.4 percent C, 2.46 percent H, and 26.9 percent Mn, corresponding to the formula $C_5H_5Mn(CO)_3$; calculated 47.0 percent C, 2.47 percent H, and 26.9 percent Mn. The yield was 75.4 percent based on the amount of dicyclopentadienyl manganese intermediate obtained, or 39.2 percent based on the amount of $MnCl_2$ employed.

In another run, the procedure of Example I was repeated except that the intermediate $(C_5H_5)_2Mn$ was not isolated. The reaction mixture containing this intermediate was reacted with carbon monoxide at pressures of 1460 to 2950 p.s.i.g. and at temperatures of 27–152° C. The product $C_5H_5Mn(CO)_3$ was separated by steam distillation and purified by sublimation. The yield was 65.6 percent based on the amount of $MnCl_2$ employed.

In general, the process of this invention is carried out at temperatures ranging from 75 to 300° C. In one preferable mode of the invention the oxo synthesis is operated at temperatures of 200 to 300° C. This is particularly advantageous as it represents a very optimum temperature range which cannot be used with prior oxo catalysts. However, as is illustrated above, this new process is also operative at the conventional oxo temperatures of the range of 75 to 200° C., and this invention also includes the use of such temperatures.

I ordinarily employ pressures between 100 and 300 atmospheres, that is, from 1470 to about 4400 p.s.i.

The amount of catalyst which I employ is generally regulated between 0.1 percent and 5 percent by weight of the weight of olefin fed to the process. The time of reaction can vary over a wide range of from a few minutes, such as 10 minutes, to several hours, such as 8 hours. Ordinarily, when operating in a batch-wise procedure I prefer to operate from about 45 minutes to 3 hours, and when operating in a continuous fashion generally I use much shorter times such as 10 to 30 minutes per pass. Frequently when operating continuously several passes are made through the reactor zone.

It is ordinarily advantageous although not necessary to conduct the reaction in the presence of a liquid diluent. This provides greater contacting of reactants and improved results. In many cases, the diluent can be the olefin being formylated. In other instances, it can consist of the liquid reaction products, particularly when the longer reaction times are employed. The diluent can likewise be an inert liquid preferably a hydrocarbon not subject to formylation. Examples are alkanes and cycloalkanes such as hexane, cyclohexane, octane, etc., and also aromatics such as benzene and toluene.

As is apparent from the description above, the present process is applicable to a wide range of olefins. Generally, mono-olefins of 2 to 12 carbon atoms are preferred. Typical examples are ethylene, propylene, the various butylenes, nonenes, dodecenes, etc. Mixed olefins can also be used and such mixtures, which constitute readily operable streams from refinery processing, are among the olefins of chief commercial interest in this reaction. Examples include the propylene tetramer, the mixture of heptylenes prepared by copolymerization of propylene and isobutylene, propylene trimer and the like. Diolefins such as butadiene can be employed as can cycloolefins such as cyclohexene and alkylated cyclohexenes.

Ordinarily, I use a 1 to 1 mixture of carbon monoxide and hydrogen (synthesis gas). However, good yields are also obtained with carbon monoxide-hydrogen mixtures which vary from about 25 to 75 percent hydrogen content, the remainder being carbon monoxide.

For the most part, my process forms the products obtained by conventional oxo synthesis. These are well known articles of commerce and their utilities are well known. The aldehyde products are most useful as intermediates for the manufacture of the corresponding alcohols and carboxylic acids. The alcohols are useful as solvents, as ingredients for plasticizers, as fuel blending agents, etc.

I claim:

1. In a process which comprises the reaction of olefins with a mixture of carbon monoxide and hydrogen at elevated temperature and pressure, the improvement of conducting said reaction in the presence of a catalytic quantity of a manganese polycarbonyl of the formula $$R_aMn(CO)_y$$

where R is selected from the group consisting of alkyl hydrocarbon groups containing from one to 12 carbon atoms, aryl hydrocarbon groups containing from 6 to 10 carbon atoms, acyl groups containing from 2 to 12 carbon atoms, and cyclopentadienyl hydrocarbon radicals containing from 5 to 9 carbon atoms, where $a$ is a whole number varying from 0 to 1 and where $y$ is an odd whole number varying from 3 to 5.

2. The process of claim 1 wherein said polycarbonyl is methyl manganese pentacarbonyl.

3. The process of claim 1 wherein said polycarbonyl is manganese pentacarbonyl.

4. The process of claim 1 wherein said polycarbonyl has the formula $RMn(CO)_5$ wherein R is an alkyl hydrocarbon group containing from 1 to 12 carbon atoms.

5. The process of claim 1 wherein said polycarbonyl has the formula $RMn(CO)_5$ wherein R is an aryl hydrocarbon group containing from 6 to 10 carbon atoms.

6. The process of claim 1 wherein said polycarbonyl has the formula $RCOMn(CO)_5$ wherein R is an alkyl hydrocarbon group containing from 1 to 11 carbon atoms.

7. The process of claim 1 wherein said polycarbonyl has the formula $RCOMn(CO)_5$ wherein R is an aryl hydrocarbon group containing up to 11 carbon atoms.

8. The process of claim 1 wherein said polycarbonyl has the formula $RMn(CO)_3$ wherein R is a cyclopentadienyl hydrocarbon radical containing from 5 to 9 carbon atoms.

9. The process of claim 1 wherein said polycarbonyl is methyl cyclopentadienyl manganese tricarbonyl.

10. In a process which comprises the reaction of olefins with a mixture of carbon monoxide and hydrogen at a temperature of 200–300° C. and elevated pressure, the improvement of conducting said reaction in the presence of a catalytic quantity of a manganese polycarbonyl of the formula $$R_aMn(CO)_y$$

where R is selected from the group consisting of alkyl hydrocarbon groups containing from 1 to 12 carbon atoms, aryl hydrocarbon groups containing from 6 to 10 carbon atoms, acyl groups containing from 2 to 12 carbon atoms, and cyclopentadienyl hydrocarbon radicals containing from 5 to 9 carbon atoms, whre $a$ is a whole number varying from 0 to 1 and $y$ is an odd whole number varying from 3 to 5.

No references cited.